United States Patent [19]
Carter

[11] Patent Number: 5,947,527
[45] Date of Patent: Sep. 7, 1999

[54] JUNCTION HOLDER FOR CONNECTING PIPES WITH MECHANICAL JOINTS

[76] Inventor: Floyd W. Carter, 6915 Cansfield Ct., Katy, Tex. 77450

[21] Appl. No.: 08/949,746

[22] Filed: Oct. 14, 1997

Related U.S. Application Data

[63] Continuation of application No. 08/555,563, Nov. 8, 1995, abandoned.

[51] Int. Cl.$^6$ .................................................... F16L 35/00
[52] U.S. Cl. .............................. 285/4; 285/337; 285/323; 285/342; 285/374; 285/421
[58] Field of Search .................................. 285/322, 114, 285/323, 374, 337, 363, 368, 412, 413, 414, 415, 4, 342, 421; 411/5

[56] References Cited

U.S. PATENT DOCUMENTS

| | | | |
|---|---|---|---|
| 1,063,926 | 6/1913 | Schuermann | 285/342 |
| 3,027,796 | 4/1962 | Shewmon | 411/5 |
| 3,561,317 | 2/1971 | Rowell | 411/5 |
| 3,594,023 | 7/1971 | Yano | 285/337 |
| 3,812,757 | 5/1974 | Reiland | 411/5 |
| 4,492,500 | 1/1985 | Ewing | 411/5 |
| 4,610,471 | 9/1986 | Halen | 285/337 |
| 4,647,083 | 3/1987 | Hashimoto | 285/374 |
| 4,867,488 | 9/1989 | Jones | 285/337 X |
| 5,297,826 | 3/1994 | Percebois et al. | 285/323 X |
| 5,299,644 | 4/1994 | Eckert | 285/323 X |

FOREIGN PATENT DOCUMENTS

| | | | |
|---|---|---|---|
| 551768 | 6/1932 | Germany | 285/337 |
| 9807 | 10/1923 | Netherlands | 285/414 |
| 74658 | 5/1954 | Netherlands | 285/414 |
| 4002770 | 2/1994 | WIPO | 285/368 |

*Primary Examiner*—Dave W. Arola
*Attorney, Agent, or Firm*—Madan & Morris, P.C.

[57] ABSTRACT

The present invention provides a pipe junction holder for connecting a pipe to a mechanical joint. The junction holder contains a wedge placed between a seal gland and a wedge gland. The wedge has a split opening along its outer sloped surface. The seal gland is adapted for connection to the mechanical joint and the wedge gland. The wedge gland is adapted to seat over the wedge and cause the wedge to clamp on the pipe when the wedge glang is connected to the seal gland. The inner surface of the wedge is designed to clamp along substantially the entire circumference of the pipe when the wedge is tightly held in place over the pipe. The invention also provides a method of joining pipes with mechanical joints, wherein a free end of the pipe is adapted to be seated in a socket end of the mechanical joint. The method comprises the steps of: (a) placing the free end of the pipe in the socket end of the mechanical joint; (b) placing a gasket in the socket end over the pipe for providing a seal between the pipe and the mechanical joint; (c) placing a seal gland adjacent to the gasket over the pipe and connecting the seal gland to the mechanical joint; (d) placing a ring wedge having a through split opening and an outer sloped surface over the pipe adjacent to the seal gland; and (e) placing a wedge gland having an inner sloped surface that is adapted to slide over the outer surface of the wedge when the wedge gland is urged over the ring wedge; and (f) connecting the wedge gland to the seal gland.

22 Claims, 5 Drawing Sheets

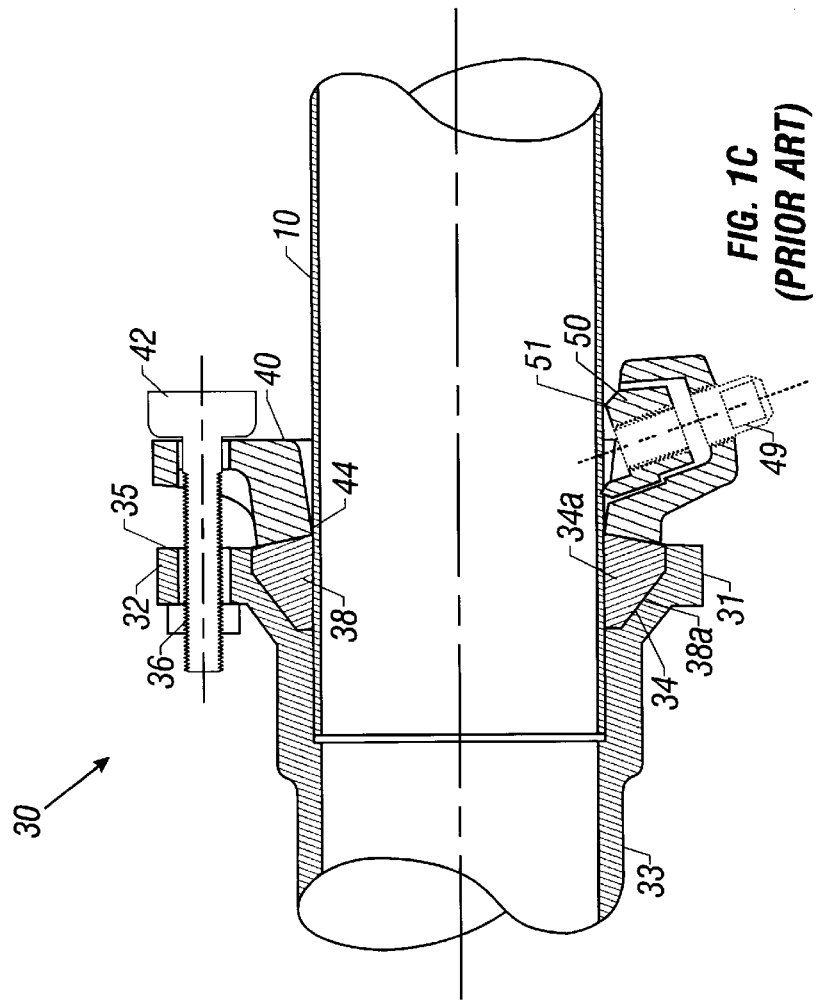
FIG. 1C (PRIOR ART)
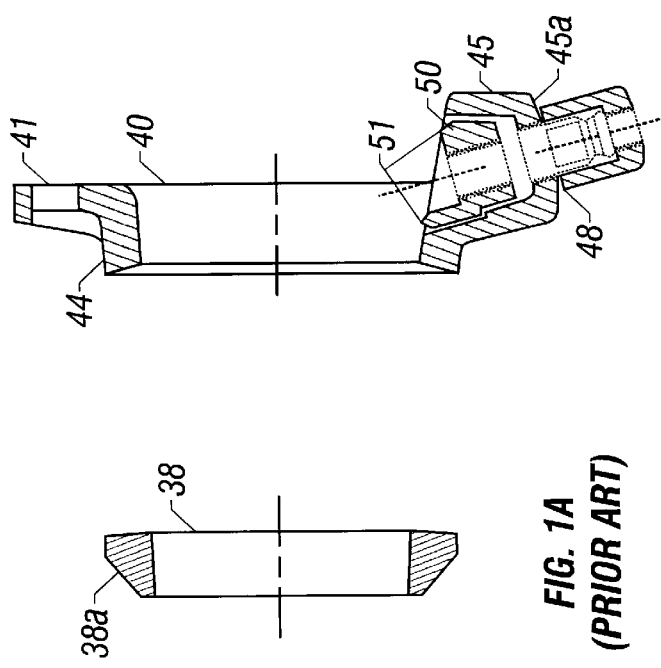
FIG. 1B (PRIOR ART)
FIG. 1A (PRIOR ART)

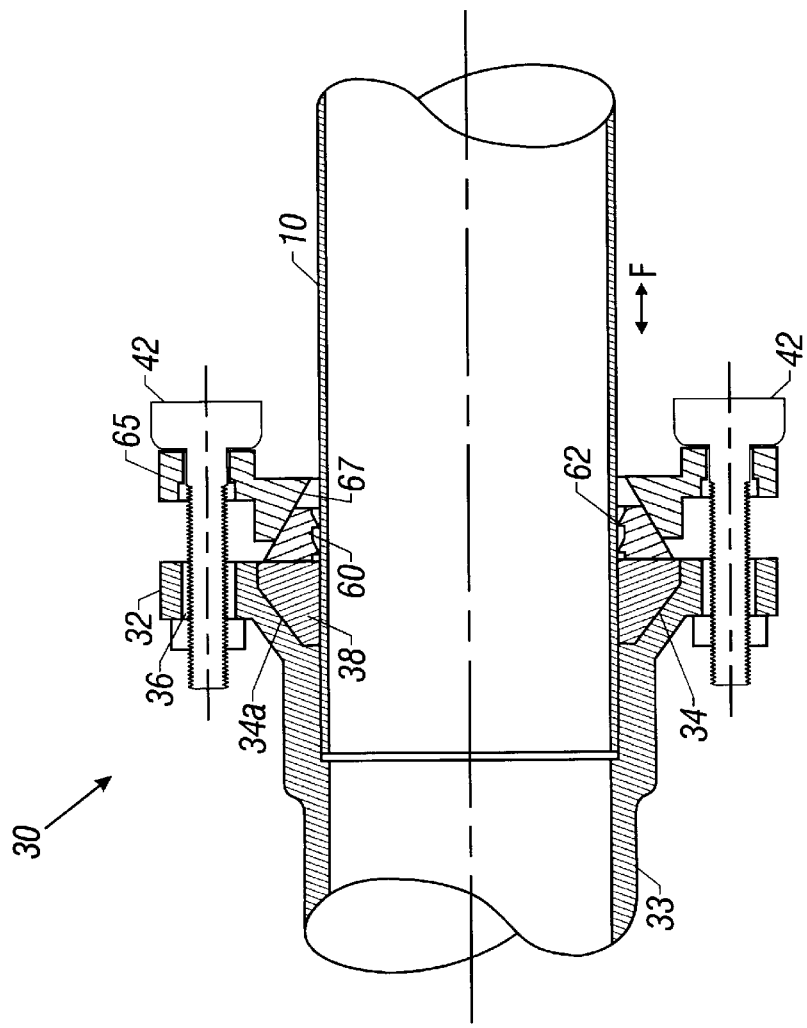
FIG. 2D (PRIOR ART)
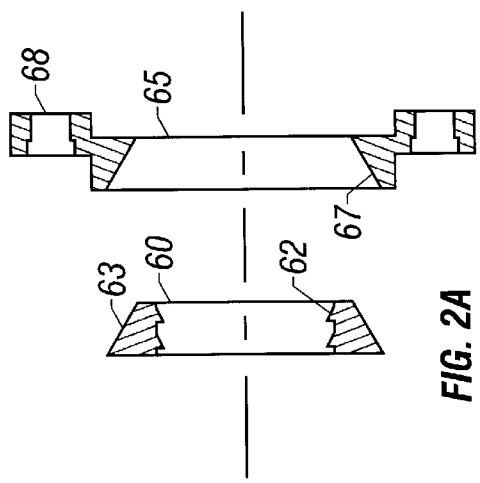
FIG. 2C (PRIOR ART)
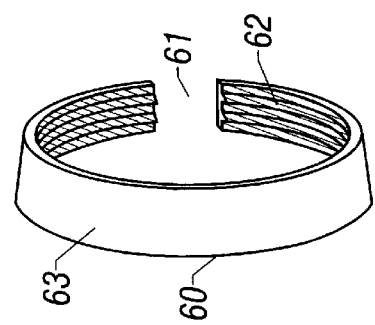
FIG. 2B (PRIOR ART)
FIG. 2A (PRIOR ART)

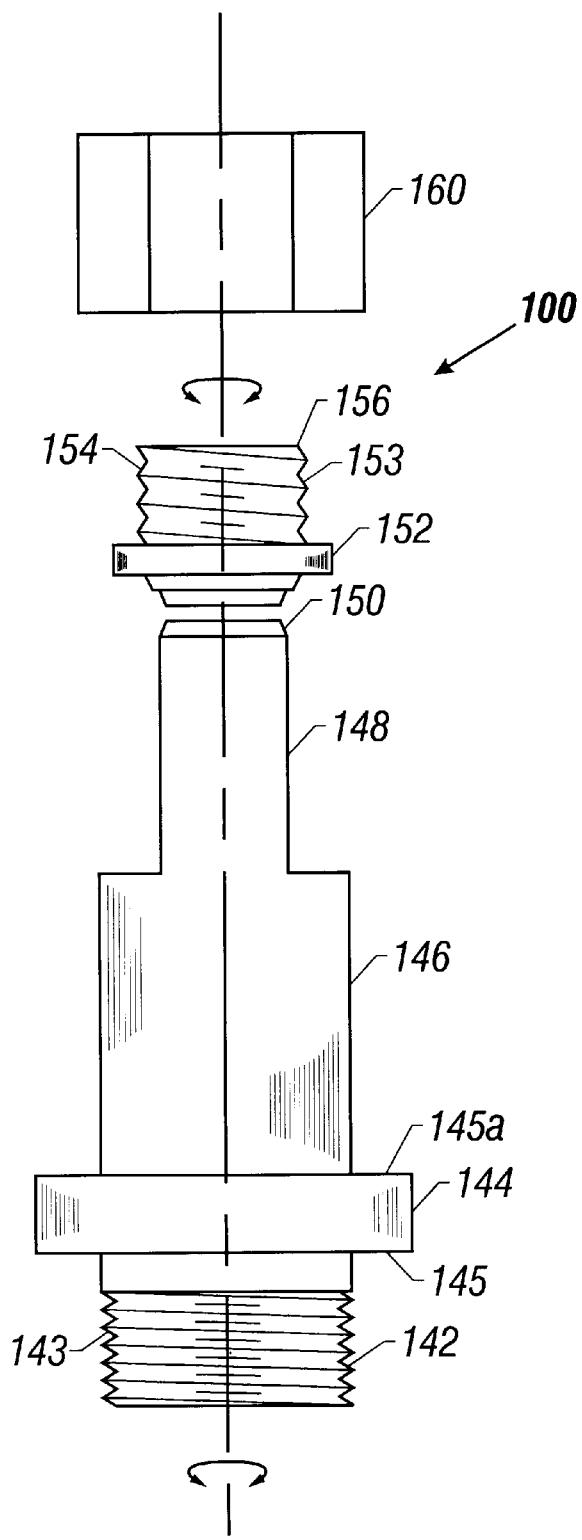
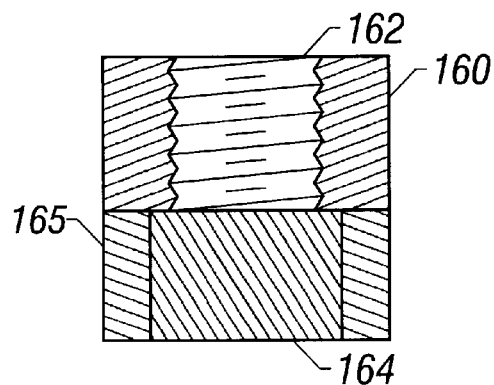
FIG. 5B
FIG. 5A

JUNCTION HOLDER FOR CONNECTING PIPES WITH MECHANICAL JOINTS

This is a continuation of application Ser. No. 08/555,563 filed Nov. 8, 1995 now abandoned.

BACKGROUND OF THE INVENTION

1. Field of the Invention

This invention relates generally to mechanical joint restraint devices and more particularly to a thrust force restraining device for connecting pipes via mechanical joints.

2. Description of the Related Art

Mechanical joints of various configurations, such as T-joints, bends, lateral joints, cross joints, etc., are commonly utilized in connecting pipes for transporting fluids therethrough. Mechanical junction holders (mechanical restraint devices) of various types have been used to connect pipes to mechanical joints and to restrain such pipes against thrust forces present when fluids flow through the pipes. One such pipe junction holder is disclosed in U.S. Pat. No. 4,092,036. FIGS. 1a–b show the components of such a device and FIG. 1c shows a cross-section of a pipe 10 connected to a mating end 31 of a mechanical joint 30 by the device shown in FIGS. 1a–b. The mating end 31 of commonly used mechanical joints, such as the mechanical joint 30 shown in FIG. 1c contains a flange 32 extending outward of the body 33 having a socket end (conical open end) 34 whose interior surface 34a has a progressively increasing diameter that terminates near the end of the flange face 35. The flange 32 has a plurality of through holes 36 along its outer periphery in which bolts may be placed for attaching the flange 32 with other devices.

To sealingly connect the pipe 10 with the mechanical joint 30, a gasket 38 (FIG. 1a) having an outer surface 38a that substantially conforms to the interior surface 34a of the mouth 34 is seated in the socket end 34. A gland 40 (FIG. 1b) having a plurality of holes 41 along its outer periphery that match in location with the holes 36 of the mechanical joint 30 is placed around the pipe 10. Bolts, such as bolt 42, are placed through the holes 36 and 41 to secure the gasket 38 in the mouth 34. As the bolts 42 are tightened, the edge 44 of the gland 40 urges the gasket 38 against the mouth 34 to provide a seal between the pipe 10 and the mechanical joint 30. The gland 40 also contains a plurality of integral spaced clamping blocks 45, each such clamping block including a lateral top wall 45a which extends sloped downward and away from the edge 44. A through-hole 48 is provided in the lateral top wall 45a for inserting therethrough a bolt 49, which causes the teeth 51 of a clamping member 50 attached thereto to bite into the pipe 10 when the bolt is tightened, thereby restraining the pipe in position.

Such a pipe junction holder is not suitable for use with commonly used non-metallic pipes, such as Poly Vinyl Chloride ("PVC") pipes, because the clamping member 50 damages the pipe 10. Additionally, such an arrangement does not restrain the pipe 10 substantially along the entire periphery, i.e., 360°, of the pipe 10, which is highly desirable because such systems generally provide better clamping action.

Another prior art clamping device is shown in FIGS. 2a–d. It includes a gasket 38 (FIG. 1a), a ring wedge 60 having teeth 62 along its interior diameter and a gland 65 having a plurality of through holes 68 along its outer periphery that match in location with the holes 36 in the mechanical joint 30 (FIG. 2d). The outer surface 63 of the wedge 60 has a reducing slope. The inner surface 67 of the gland 65 is sloped so that it slides over the wedge's outer surface 63. The wedge 60 has a small opening 61 along its entire axial direction so that when the gland 65 is forced to slide over the ring wedge 60, it causes the wedge's inner diameter to decrease. To connect the pipe 10 with the mechanical joint 30, the gasket 38 is first seated or placed in the socket end 34 of the mechanical joint 30. The wedge 60 is then placed juxtaposed to the gasket 38 so that its outer surface 63 slopes downward away from the mechanical joint 30. The gland 65 is then slid over the gasket 38 and secured to the mechanical joint 30 by bolts 42 placed in the holes 36 of the coupling 31 and the corresponding holes 68 of the gland 65. The tightening of the bolts 42 causes the gland 65 to slide over the wedge 60, which causes the inner diameter of the wedge 60 to reduce in size and thereby urges the teeth 62 to bite into the pipe 10, which holds the pipe in place.

A disadvantage of such a device is that it frequently does not provide a proper seal between the pipe 10 and the mechanical joint 30. This is because the wedge 60 does not always exert adequate axial force "F" to cause the gasket 38 to attain a proper seal between the pipe 10 and the mechanical joint 30. Frequently, as the bolts 42 are tightened, the wedge 60 engages with the pipe 10 before the seal is accomplished by the gasket 38. To correct this problems, the pipe fitters either apply greater than the recommended torque to the bolts 42, which can damage the pipes, or by repeating the clamping procedure, which incurs undesired delays and expense.

The present invention addresses the above-noted problems and provides a universal mechanical junction holder for sealingly coupling metallic and non-metallic pipes with mechanical joints. The system also preferably utilizes the bolt described in the U.S. patent application Ser. No. 08/491, 270, which is incorporated herein by reference, to ensure that the torque applied to the clamping member does not exceed a predetermined amount.

SUMMARY OF THE INVENTION

The present invention provides a pipe junction holder for connecting a pipe to a mechanical joint. The junction holder contains a wedge placed between a seal gland and a wedge gland. The wedge has a through split opening along its outer sloped surface. The seal gland is adapted for connection to the mechanical joint and the wedge gland. The wedge gland is adapted to seat over the wedge and cause the wedge to restrain the pipe when the wedge gland is connected to the seal gland. The inner surface of the wedge is designed to clamp along substantially the entire circumference of the pipe when the wedge is tightly held in place over the pipe.

To connect a pipe to the mechanical joint, a free end of the pipe is seated in a socket end of the mechanical joint. A gasket adapted to seal the pipe and the mechanical joint is placed in the socket end. The seal gland is then connected to the mechanical joint which urges the gasket in the socket end to provide a seal between the pipe and the mechanical joint. The wedge is placed juxtaposed the seal gland. The wedge gland is then placed over the wedge and connected to the seal gland which causes the wedge to clamp over the pipe and retain it in position, thereby providing the restraining action independent of the seal.

The invention provides a method of joining pipes with mechanical joints, wherein a free end of the pipe is adapted to be seated in a socket end of the mechanical joint. The method comprises the steps of: (a) placing the free end of the pipe in the socket end of the mechanical joint; (b) placing a gasket in the socket end over the pipe for providing a seal between the pipe and the mechanical joint; (c) placing a seal gland adjacent to the gasket over the pipe and connecting the seal gland to the mechanical joint; (d) placing a ring wedge having a split opening and an outer sloped surface over the pipe adjacent to the seal gland; and (e) placing a wedge gland having an inner sloped surface that is adapted to slide over the outer surface of the wedge when the wedge gland is urged over the ring wedge; and (f) connecting the wedge gland to the seal gland.

Examples of the more important features of the invention thus have been summarized rather broadly in order that detailed description thereof that follows may be better understood and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment taken in conjunction with the accompanying drawings, in which like elements have been given like numerals and wherein:

FIG. 1a shows a cross-section of a commonly used gasket for providing a seal between a pipe and a mechanical joint.

FIG. 1b shows a cross-section of a prior art pipe junction holder for connecting a pipe a mechanical joint.

FIG. 1c shows a cross-sectional elevation view of a pipe and a mechanical joint connected by the pipe junction holder of FIG. 1b.

FIGS. 2a–c show cross-sections of a prior art wedge and gland used as a pipe junction holder.

FIG. 2d shows a cross-sectional elevation view of a pipe and a mechanical joint connected by the pipe junction holder of FIGS. 2a–c.

FIGS. 5a–b show the preferred bolt for in the system of the junction holder of the present invention to restrain the pipe.

DETAILED DESCRIPTION OF THE PREFERRED EMBODIMENT

Figure 3C:
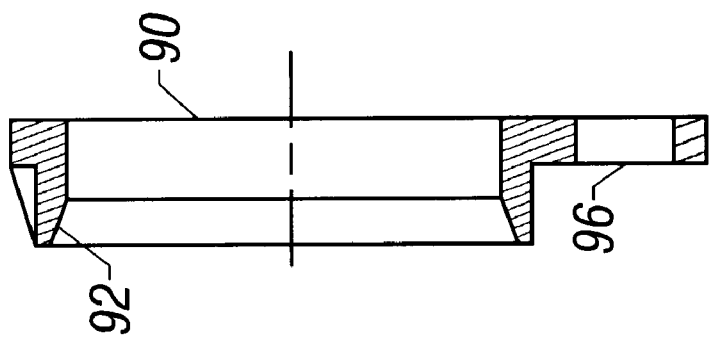
FIGS. 3a–c show cross-sections of the components of the pipe junction holder according to the present invention.
Figure 3B:
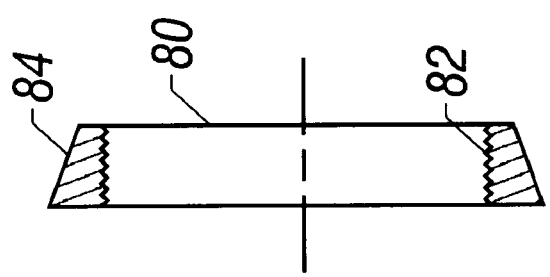
Figure 3A:
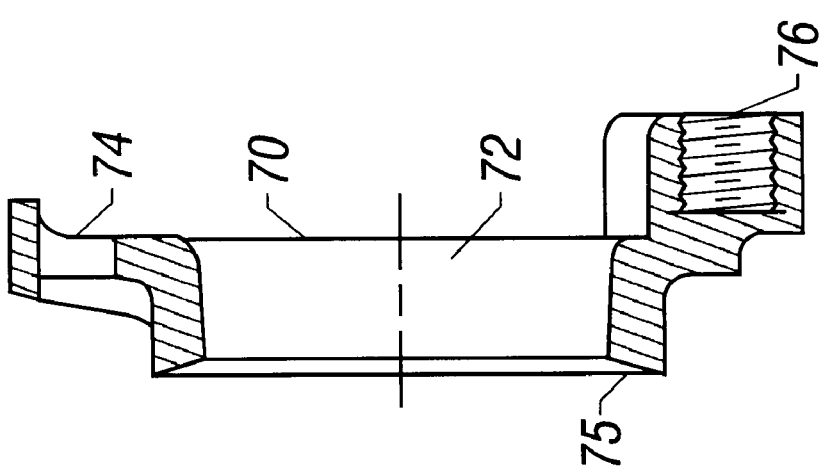
Figure 4A:
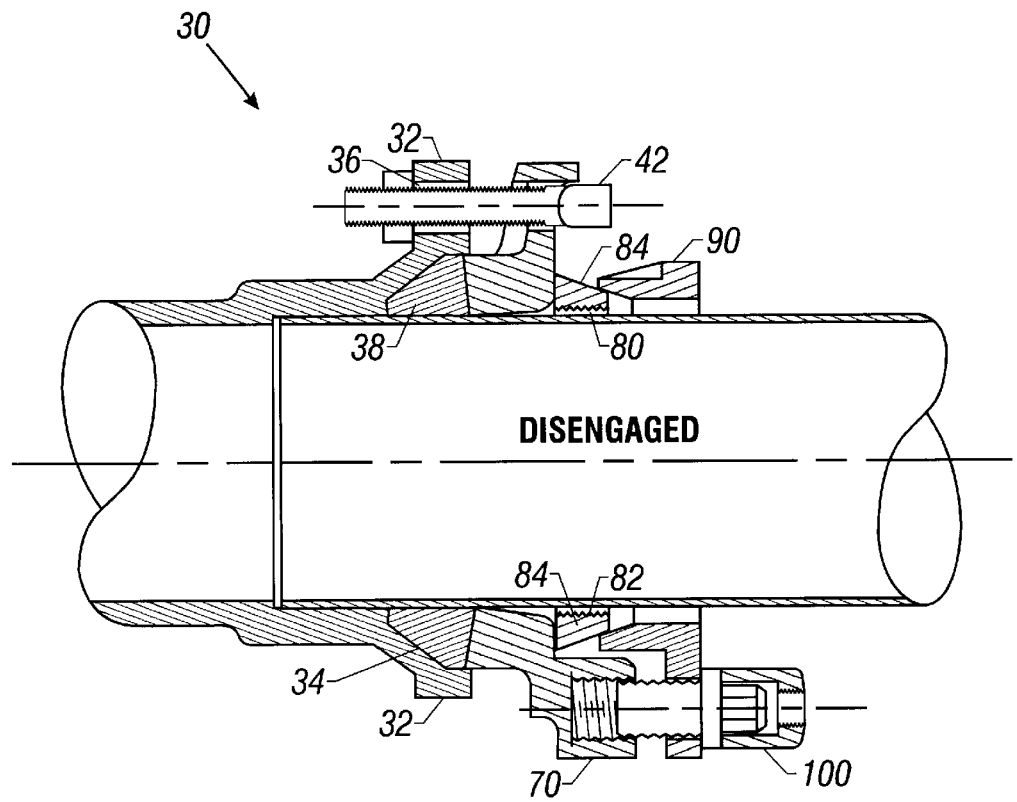
FIGS. 4a–b respectively show the cross-sectional elevational views of a pipe connected to a mechanical joint by the pipe junction holder according the present invention in the disengaged and the engaged positions.

FIGS. 3a–c show the components or elements comprising the junction holder (restraint device or the clamping system) in the sequence of their placement for connecting a pipe with a mechanical joint according to the present invention. FIGS. 4a and b respectively show cross-section of a pipe and mechanical joint connected by the pipe junction holder according to the present invention respectively in the disengaged and engaged positions. The components of the junction holder include a gasket 38, seal gland 70, a wedge 80 and a wedge gland 90. As previously described, the gasket 38 is placed in the socket end of the mechanical joint 30 as described earlier. The seal gland 70 has a through-hole 72 for accommodating the pipe 10 therein and further contains a plurality of holes 74 along its outer periphery that match the holes 36 of the mechanical joint 30. The seal gland 70 also contains a plurality (preferably at least three) of internally threaded holes 76 spaced along its outer periphery.

To sealingly and securely connect the pipe 10 with the mechanical joint 30, the gasket 38 is placed in the socket end 34 as described with respect to FIGS. 1c and 2d. The seal gland 70 is then placed against the gasket 38 and securely connected to the mechanical joint 30 by a suitable means such as bolts 42 placed through holes 36 in the mechanical joint 30 and the holes 74 in the seal gland 70. As the bolts 42 are tightened, the edge 75 of the gland 70 urges the gasket 38 against the inside of the socket end 34, thereby providing a positive seal between the pipe 10 and the mechanical joint 30.

Figure 4B:
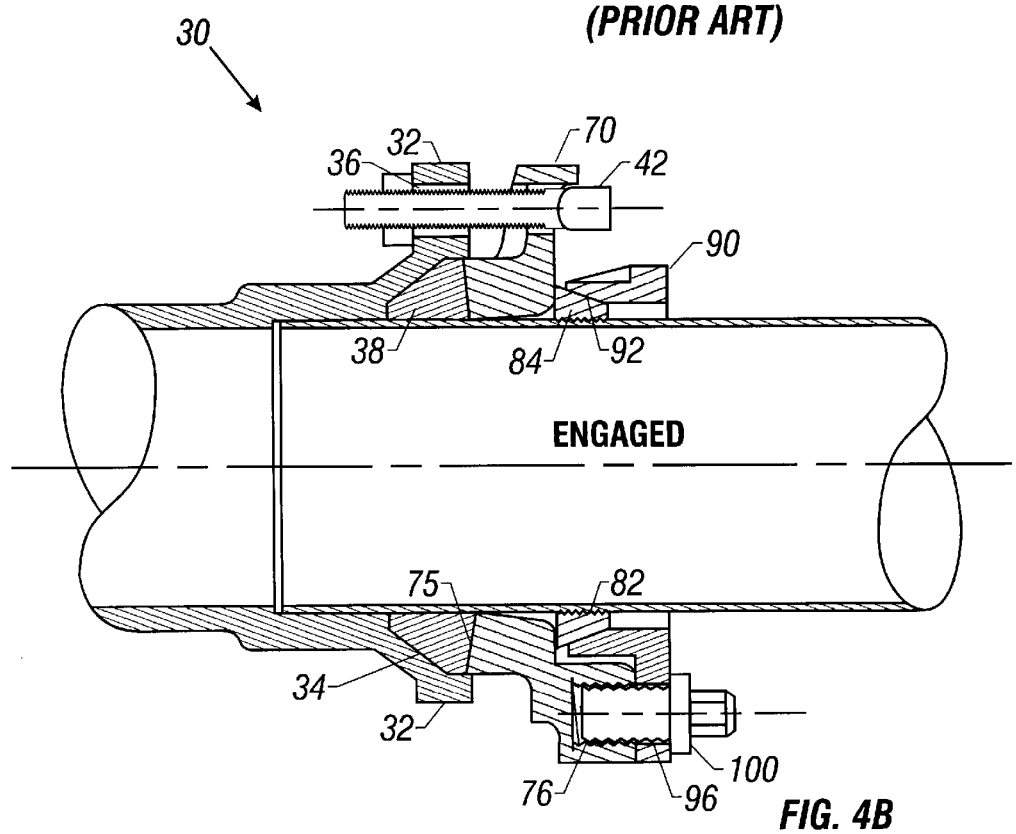

A wedge 80 (preferably a ring wedge) having an internally threaded surface 82 and an outer surface that slopes downward away from the mechanical joint 30 is placed juxtaposed the seal gland 70. The internal surface 82 of the wedge 80 may have any configuration that is adapted to restrain the pipe from lateral movement when such surface is urged against the pipe 10. The wedge gland 90 having an inner surface 92 that substantially matches the outer surface 84 of the wedge 80 and having a plurality of holes 96 along its outer periphery that match with the threaded holes 76 in the seal gland 70 is placed over the wedge 80 as shown in FIG. 4a. In this position, the wedge 80 is disengaged from the pipe 10. The wedge gland 90 is then bolted with the gland 70 by means of threaded bolts 100 placed through the holes 96 in the wedge gland 90 and engaging the same with the threaded holes 76 in the seal gland 70. As the bolts 100 are tightened, the end of the wedge gland between the periphery of the seal gland 70 and the pipe 10 forces the wedge 80 towards the pipe 10 and the inner surface 92 of the wedge gland 90 slides over the outer surface 84 of the wedge 80, causing the wedge to squeeze and thereby causing the inner surface 82 of the wedge 80 to bite into the pipe 10 as shown in FIG. 4b. In this position, the wedge is fully engaged with the pipe 10. The bolts 100 preferably are torque-limiting type bolts that are pre-set to a predetermined torque limit so as to avoid over-torquing the wedge over the pipe in the field. However, for the purpose of this invention, any other suitable device or means may be utilized to connect the seal gland to the mechanical joint and to connect the seal and wedge gland.

Pipes connected with mechanical joints as described above are typically utilized for transporting fluids therethrough. When the fluid flowing through the pipe is not exerting radial pressure on the pipe, the wedge gland 90 causes the wedge 80 to restrain the pipe with zero internal pipe pressure. As the internal fluid pressure increases, it causes the pipe to move away from the mechanical joint 30, which movement causes the wedge 80 to move with the pipe and thereby increasing the clamping pressure on the pipe. The clamping pressure continues to increase as the internal pipe pressure increases. The clamping pressure therefore is proportional or a function of the internal fluid pressure.

Thus, the present invention provides a restraint system for sealingly joining pipes, wherein the sealing mechanism (the gasket and seal gland) and the engaging or clamping mechanism (the wedge and wedge gland) are independent of each other. This system ensures that the seal between the pipe 10 and the mechanical joint 30 is made independent of and prior to restraining the pipe. The restraining (clamping) is achieved substantially along the entire periphery of the pipe 10, as the wedge 80 surrounds the pipe 10 substantially 360°. The system of the present invention can be used effectively for joining both metallic and non-metallic pipes.

As noted earlier, it is desirable restrain the wedge 80 over the pipe 10 at a predetermined torque which ensures proper clamping without damaging the pipes. Typical recommended torque is about 90 foot-pounds. The present invention preferably utilizes the bolt shown in FIGS. 5a–c as the bolts 100 for restraining the pipe 10.

Turning now to FIG. 5a, the bolt 100 has an annular flange or shoulder 144 having a diameter that is greater than the hole 76 (FIG. 4a), a lower threaded portion 142 and a substantially cylindrical shank 146. The upper portion of the shank 146 has a neck 148 which preferably may be turned by utilizing a readily available tool, such as a spanner. Any other suitable provision may be made in place of the neck 148 that will enable the bolt 100 to be turned by a desired means. The bolt 100 has a weak point 150 between the neck 148 and a second flange 152. The bolt 100 terminates at an upper threaded end 154 above the upper flange 152. The upper threads 156 and lower threads 142 are made in the same direction.

A torque nut 160, shown in FIG. 5a having an upper threaded portion 162 and a lower hollow threaded portion 164 is threadably placed (screwed) on to the upper threaded end 154. The lower hollow portion 164 has an internal diameter that is smaller than the diameter of the flange 152 so that when the nut 160 is fully engaged with the threads 156, the seat 165 rests against the upper surface 153 of the flange 152. When the torque on the nut 160 reaches a predetermined limit, the bolt breaks at the weak point 150. The bolt 100 may be removed by using a suitable wrench in the neck 148. Any desired predetermined torque limit for the bolt 100 may be set by appropriately designing the weak point by known methods in the art. A torque limit of ninety (90) foot-pounds is frequently used for clamping pipes to restraining members. The pipe junction holders described herein are usually transported without protective packaging. The design of the nut of the present invention ensures that the entire assembly remains together during transportation. Further, vibrations during transportation do not loosen the assembly. It should be noted that any other suitable means may be used to connect the seal and wedge glands and that the design of the bolt 100 may be changed, for example, to eliminate the nut 160.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A pipe junction holder for connecting a pipe to a mechanical joint having a socket end, said junction holder comprising:
   (a) a first gland and a second gland, the first gland being connected to the mechanical joint and to the second gland, said first gland having an inner periphary;
   (b) a plurality of first coupling devices for coupling the first gland to the mechanical joint;
   (c) a plurality of second coupling devices for coupling the first gland to the second gland;
   (d) a wedge having a split opening, the wedge being in contact with the first gland and having an outer sloped surface in direct contact with the second gland; and
   (e) a gasket in the socket end of the mechanical joint forming a seal between the pipe and the mechanical joint;
wherein an end of the second gland engages said inner periphery of the first gland and causes the wedge to restrain the pipe when the second gland is coupled to the first gland and the first gland causes the gasket to form a seal between the pipe and the mechanical joint when the first gland is connected to the mechanical joint.

2. The apparatus as specified in claim 1, wherein an inner surface of the wedge defines a restraining surface.

3. The apparatus as specified in claim 2, wherein the restraining surface contains teeth.

4. The apparatus as specified in claim 1, wherein the second gland has a sloped inner surface that compresses the outer surface of the wedge when the second gland is connected to the first gland.

5. The apparatus as specified in claim 1, wherein the first gland has a plurality of holes for accommodating the plurality of first coupling devices for connecting the first gland to the mechanical joint.

6. The apparatus as specified in claim 1, wherein the first gland has a plurality of holes for accommodating said plurality of second coupling devices for connecting the first gland to the second gland.

7. The apparatus as specified in claim 1, wherein the inner sloped surface of the second gland compressibly slides over the outer surface of the wedge when the second gland is connected to the first gland and wherein the first gland has a plurality of holes for accommodating the plurality of first coupling devices for connecting the first gland to the mechanical joint and a second plurality of holes for accommodating the plurality of second coupling devices for connecting the first and second glands.

8. The apparatus as specified in claim 7, wherein the plurality of second coupling devices are torque limiting devices.

9. The apparatus as specified in claim 8, wherein the torque limiting devices are set to about 90 foot-pounds.

10. A junction holder for sealingly connecting a pipe to a mechanical joint having a socket end for receiving therein the pipe, the junction holder comprising:
   (a) a gasket seated in the socket end for providing a seal between the mechanical joint and the pipe;
   (b) a first gland slidably placed on the pipe and connected to the mechanical joint by a plurality of first coupling devices;
   (c) a ring wedge having a split opening and an outer sloped surface, the ring wedge slidably placed over the pipe and in direct contact with the first gland;
   (d) a second gland having:
      (i) an end engaging an inner periphery of the first gland, and
      (i) an inner surface substantially matched to an outer surface of the wedge that compresses the wedge when he second gland is urged to slide over the wedge; and
   (e) a torque-limiting device for connecting the first and the second glands.

11. A junction holder for sealingly connecting a pipe to a mechanical joint having a socket end for receiving therein the pipe, said junction holder comprising:
   (a) a gasket seated in the socket end for providing a seal between the mechanical joint and the pipe;
   (b) a first gland slidably positioned over the pipe causing the gasket to urge against the socket when the first gland is connected to the mechanical joint by a plurality of first coupling devices;
   (c) a ring wedge having a split opening and an outer sloped surface, wherein the ring wedge is slidably positioned over the pipe and in direct contact with the first gland; and (d) a second gland having an inner surface slidably placed over the sloped outer surface of the ring wedge, wherein an end of the second gland engages an inner periphery of the first gland and is urged to slide over the ring wedge and couple to the first gland by a plurality of second coupling devices, thereby providing connecting and sealing that are independent of each other.

12. The apparatus as specified in claim 11, wherein an inner surface of the wedge defines a restraining surface.

13. The apparatus as specified in claim 11, wherein the inner surface of the second gland compresses the outer surface of the wedge when the second gland is connected to the first gland.

14. The apparatus as specified in claim 11, wherein the first gland has a plurality of holes for accommodating the plurality of the first coupling devices for connecting the first gland to mechanical joint.

15. The apparatus as specified in claim 14, wherein the first gland has a plurality of holes for accommodating the plurality of the second coupling devices for the first gland to the second gland.

16. The apparatus as specified in claim 11, wherein the sloped inner surface of the second gland compressibly slides over the outer surface of the wedge when the second gland is connected to the first gland and wherein the first gland has a plurality of holes for accommodating the plurality of first coupling devices for connecting the first gland to the mechanical joint and a second plurality of holes for accommodating the plurality of second coupling devices for connecting the first and second glands.

17. The apparatus as specified in claim 16, wherein the plurality of second coupling devices are torque limiting devices.

18. The apparatus as specified in claim 17, wherein the torque limiting devices are set to about 90 foot-pounds.

19. A method for sealingly joining a pipe and a mechanical joint, wherein the mechanical joint has a socket end for receiving therein a straight end of the pipe, said method comprising the steps of:

(a) placing the straight end of the pipe in the socket end of the mechanical joint;

(b) placing a gasket in the socket end of the mechanical joint for providing a seal between the pipe and the mechanical joint;

(c) connecting the mechanical joint to a first gland that urges the gasket in the socket end;

(d) placing a restraining device over the pipe, the restraining device including a ring wedge with a split opening in direct contact with the first gland; and (e) securing the restraining device over the pipe with a second gland that has
  (i) an end in engagement with an inner periphery of the first gland, and
  (ii) an inner surface substantially matched to an outer surface of the wedge, thereby independent sealing and connecting the pipe to the mechanical joint.

20. The method as specified in claim 19, wherein the second gland is secured by means of a torque-limiting device.

21. The method as specified in claim 20, wherein the second gland compressibly slides over the outer surface of the wedge when the second gland is connected to secure the restraining device.

22. The method as specified in claim 19, wherein the inner surface of the restraining device defines a restraining surface and the second gland is secured by means of a torque limiting device.

* * * * *